(12) United States Patent
Cannon et al.

(10) Patent No.: US 6,930,792 B2
(45) Date of Patent: Aug. 16, 2005

(54) WEB-ENABLED LIVE SCANNER AND METHOD FOR CONTROL

(75) Inventors: Greg L. Cannon, Boynton Beach, FL (US); William G. Siegel, Wellington, FL (US); David P. Kilp, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/345,374

(22) Filed: Jan. 16, 2003

(65) Prior Publication Data

US 2004/0025187 A1 Feb. 5, 2004

Related U.S. Application Data

(60) Provisional application No. 60/400,050, filed on Aug. 2, 2002.

(51) Int. Cl.[7] ................................................. G06K 9/00
(52) U.S. Cl. ...................... 358/1.15; 382/115; 382/124; 709/220
(58) Field of Search ................................ 709/220, 221, 709/222, 203, 223, 224, 206; 358/1.15, 2.1, 1.16, 402, 403, 407, 442; 382/124, 125, 126, 115

(56) References Cited

U.S. PATENT DOCUMENTS

| | | | |
|---|---|---|---|
| 5,509,083 A | * | 4/1996 | Abtahi et al. ............... 382/124 |
| 6,182,076 B1 | | 1/2001 | Yu et al. ....................... 707/10 |
| 6,266,433 B1 | * | 7/2001 | Bolle et al. .................. 382/125 |
| 6,429,952 B1 | * | 8/2002 | Olbricht ....................... 358/442 |
| 6,463,343 B1 | * | 10/2002 | Emens et al. .................. 700/83 |
| 6,473,796 B2 | * | 10/2002 | Tanaka ......................... 709/224 |
| 6,578,067 B1 | * | 6/2003 | Okazaki et al. .............. 709/203 |
| 2002/0097142 A1 | * | 7/2002 | Janiak et al. ............... 340/5.53 |
| 2002/0191082 A1 | * | 12/2002 | Fujino et al. ........... 348/211.14 |
| 2003/0128240 A1 | * | 7/2003 | Martinez et al. ............. 345/764 |
| 2003/0140090 A1 | * | 7/2003 | Rezvani et al. ............. 709/203 |
| 2003/0152254 A1 | | 8/2003 | Ha et al. ..................... 382/124 |

OTHER PUBLICATIONS

International Search Report for International Application No. PCT/US03/23493, 2 pages, mailed Mar. 31, 2004.

* cited by examiner

Primary Examiner—Joseph R. Pokrzywa
(74) Attorney, Agent, or Firm—Sterne, Kessler, Goldstein & Fox P.L.L.C.

(57) ABSTRACT

A web-enabled live scanner is provided. In one embodiment, a live scanner includes an image interface capable of being coupled to a network. A camera detects an image of a print. The image is stored in a memory. The image interface includes a web server, socket server, and a picture taker. A remote user can use a browser to control the web-enabled live scanner over a network.

35 Claims, 17 Drawing Sheets

IMAGE DELIVERY

Device Configuration

Operational

☒ Unit is only an Ethernet Camera

UI

☒ Sound alert on Good fingerprint scan
☒ Sound alert on Bad fingerprint scan
☒ Play sound at startup

Camera

[10] The number of fingerprint ridges on a line before a fingerprint is examined.
[10] Bad image count threshold.
[0] Contrast
[100] Gain(100x)
[45160000] Integration time.
[255] Illumination level.
Select how to normalize the fingerprint image
none: ⊙
proportional: ○
decimated: ○
neighbor: ○

☒ Flip image horizontally

☐ Flip image vertically

☒ Invert image

☒ Use finger Sensor

☒ Save Bitmap

☒ Save PNG

☒ Save Decimated Images

☐ Rolled Fingerprint

☐ Upsample Images to get into spec
[485] Measured Horizontal dpi.

[Update] [Reset]

FIG. 11

WEB-ENABLED LIVE SCANNER AND METHOD FOR CONTROL

This application claims the benefit of U.S. Provisional Application No. 60/400,050, filed Aug. 2, 2002.

BACKGROUND OF THE INVENTION

1. Field of Invention

The present invention relates to live scanning of prints.

2. Related Art

Biometrics is the science of biological characteristic analysis. A biometric is a measurable, physical characteristic or personal behavioral trait used to recognize or verify the identity of a person. Prints, such as, fingerprints or palm prints, include biometric information. A print has associated minutiae that can be used to recognize or verify the identity of a person. Such minutiae includes information on the distinctive points of a particular print, such as ridge endings, deltas, and bifurcations.

Prints have long been detected and stored using ink and paper. Live scanners are now available which detect a print from a live object and generate a digital representation of the detected print. Live scanners use light to detect an image of a print. A live object having a print, such as a finger, palm, hand or foot, is placed on a platen. An illumination source illuminates the underside of the platen. An image representative of the valleys and ridges of the print is detected by an image sensor, such as, one or more solid-state cameras.

Access to and control of conventional live scanners has been limited. Many conventional live scanners were specialized, stand-alone products. For example, live scanners were often sold in an expensive booking system to law enforcement. A local user-interface was the sole means a user could access and operate the live scanner. One advancement in live scanners was the development of a live scanner that could be controlled by a local personal computer. For example, Cross Match Technologies, Inc. has made available an ID-1000® live scanner with a IEEE. 1394 (Firewire) interface. Such an interface, however, is platform-dependent and requires software installation at both the live scanner and the local personal computer. This increases installation complexity and cost. Access and control of a live scanner remains limited to a user at the local, specially configured personal computer.

SUMMARY OF THE INVENTION

The present invention overcomes each of the above-identified problems and has additional advantages as described herein.

The present invention provides a web-enabled live scanner and a method and system for controlling the web-enabled live scanner through a browser. The live scanner can be accessed over a network. The live scanner includes a camera and an image interface. The camera detects images of prints. The image interface can be coupled to a browser over the network. The image interface fulfills at least one control option for the live scanner selected by a user at the browser. In one embodiment, the image interface includes a web server, such as, an HTTP server. The web server serves a menu of control options to the browser.

According to a further feature, the control options include unconditional and conditional image delivery. When a user selects an unconditional image delivery control option, the web server retrieves stored print image data representative of a detected print image and sends the retrieved print image data to the browser. When a user selects a conditional image delivery control option, the web server retrieves print image data representative of a detected print image and sends the retrieved print image data to the browser only when at least one delivery condition has been met. In one example, two delivery conditions are a socket present condition and a finger present condition.

Other live scanner control options provided at the browser include a provide file format option, a display files listing option, and a configure device option. In one example, in response to a user selecting the configure device option at the browser, the web server sends data relating to a menu of device configuration options of the live scanner to the browser. The device configuration options include any combination of the following configuration options: device settings, browse file system, system log, set time/date, network configuration, release notes, image encryption, host name, system information, operation control, and administrator password change.

According to a further feature, when a user selects the device settings configuration option at the browser, the web server sends data relating to at least one of user interface settings, camera settings, print image processing settings, and live scanner settings. User interface settings include settings for toggling on or off a sound alert on an acceptable print scan, a sound alert on an unacceptable print scan, and/or play sound at start up. Camera settings include settings for contrast, gain, and/or integration time. Print image processing settings include settings for a ridge threshold, an unacceptable image count threshold, print image normalization, and/or print image orientation. Live scanner settings include an illumination level setting for setting an illumination level, and a finger sensor setting for toggling use of the finger sensor on or off. Live scanner settings can further include settings for selecting storage of different file format types, toggling on or off the capture of a rolled print, toggling on or off the upsampling of images, and/or inputting a measured horizontal resolution value.

In one embodiment, the web-enabled live scanner further includes a finger sensor that senses the presence or absence of a finger on a platen of the live scanner. The image interface includes a web server, a socket server, and a picture taker. The socket server establishes a socket connection with the browser. Alternatively, a datagram server can be used instead of a socket server.

According to one implementation, a camera only detects and stores a new image in response to a finger present signal from a finger sensor or a request to take next picture to the camera sent from the picture taker. When the camera stores a new image, the camera sends a notify signal to the picture taker. In response, the picture taker generates and sends a notify signal to the socket server (or to a datagram server). The socket server then notifies the browser. The notify signal from the picture taker represents a get image true condition. The browser can include an applet or code so that upon receipt of the notify signal with get image true information, the browser automatically requests an image from the web server in the live scanner. The web server then retrieves and sends the newly stored to the browser.

According to one example implementation, the web-enabled live scanner is Ethernet ready. The web-enabled live scanner has an Ethernet physical interface and an Ethernet transceiver for coupling the image interface to a network. Any Ethernet physical interface can be used including, but not limited to, a 10BASE-T or 100BASE-T interface.

The present invention also provides a method for controlling a web-enabled live scanner. The method includes establishing a web connection between a browser and the web-enabled live scanner, providing a menu of control options at the browser, whereby, a control option can be selected by a user at the browser, and fulfilling the selected control option at the web-enabled live scanner. The web connection establishing step establishes a web connection between a web server running in the web-enabled live scanner and the browser. The control options include unconditional and conditional image delivery control options. In response to a user selecting the unconditional image delivery control option at the browser, the fulfilling step includes retrieving stored print image data representative of a detected print image and sending the retrieved print image data to the browser. In response to a user selecting the conditional image delivery control option at the browser, the fulfilling step includes retrieving print image data representative of a detected print image and sending the retrieved print image data to the browser only when at least one delivery condition has been met.

One advantage of the present invention is that web technology is leveraged in a live scanner. The web-enabled live scanner can be controlled through a browser over a network. No custom software or software development kit is needed at a client to control a live scanner. The web-enabled live scanner is easily connected to a network. Any conventional browser can be used. The web-enabled live scanner is compatible with multiple types of operating systems and platform independent.

Further embodiments, features, and advantages of the present invention, as well as the structure and operation of the various embodiments of the present invention are described in detail below with reference to accompanying drawings.

BRIEF DESCRIPTION OF THE FIGURES

The present invention is described with reference to the accompanying drawings. In the drawings, like reference numbers indicate identical or functionally similar elements.

FIG. 11 is a browser screen shot that shows an implementation of the specific device configuration settings and control options used to control the web-enabled live scanner according to an embodiment of the present invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "live scan" refers to a scan of any type of live object made by a live scanner. A live scan can include, but is not limited to, a scan of a finger, palm, toe, heel, a finger roll, a flat finger, slap print of four fingers, thumb print, palm print, or a combination of fingers, such as, sets of fingers, thumbs, or toes from one or more hands, one or more palms, or one or more feet disposed on a platen.

In a live scan, one or more fingers or palms from either a left hand or a right hand or both hands are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A print of toes or a foot can also be captured. A platen can be movable or stationary depending upon the particular type of scanner and the type of print being captured by the scanner.

The terms "biometric imaging system", "scanner", "live scanner", and "live print scanner" are used interchangeably, and refer to any type of scanner which can obtain an image of all or part of one or more fingers, palm, and/or foot in a live scan. A live scanner can include, but is not limited to, a fingerprint scanner, or a palm print scanner.

The term "platen" refers to a component that includes an imaging surface upon which at least one live object (i.e, a finger, palm, toe or foot) is placed during a live scan. A platen can include, but is not limited to, a surface of an optical prism, set of prisms, or set of micro-prisms, or a surface of a silicone layer or other element disposed in optical contact with a surface of an optical prism, set of prisms, or set of micro-prisms.

Web-Enabled Live Scanner

Figure 1:
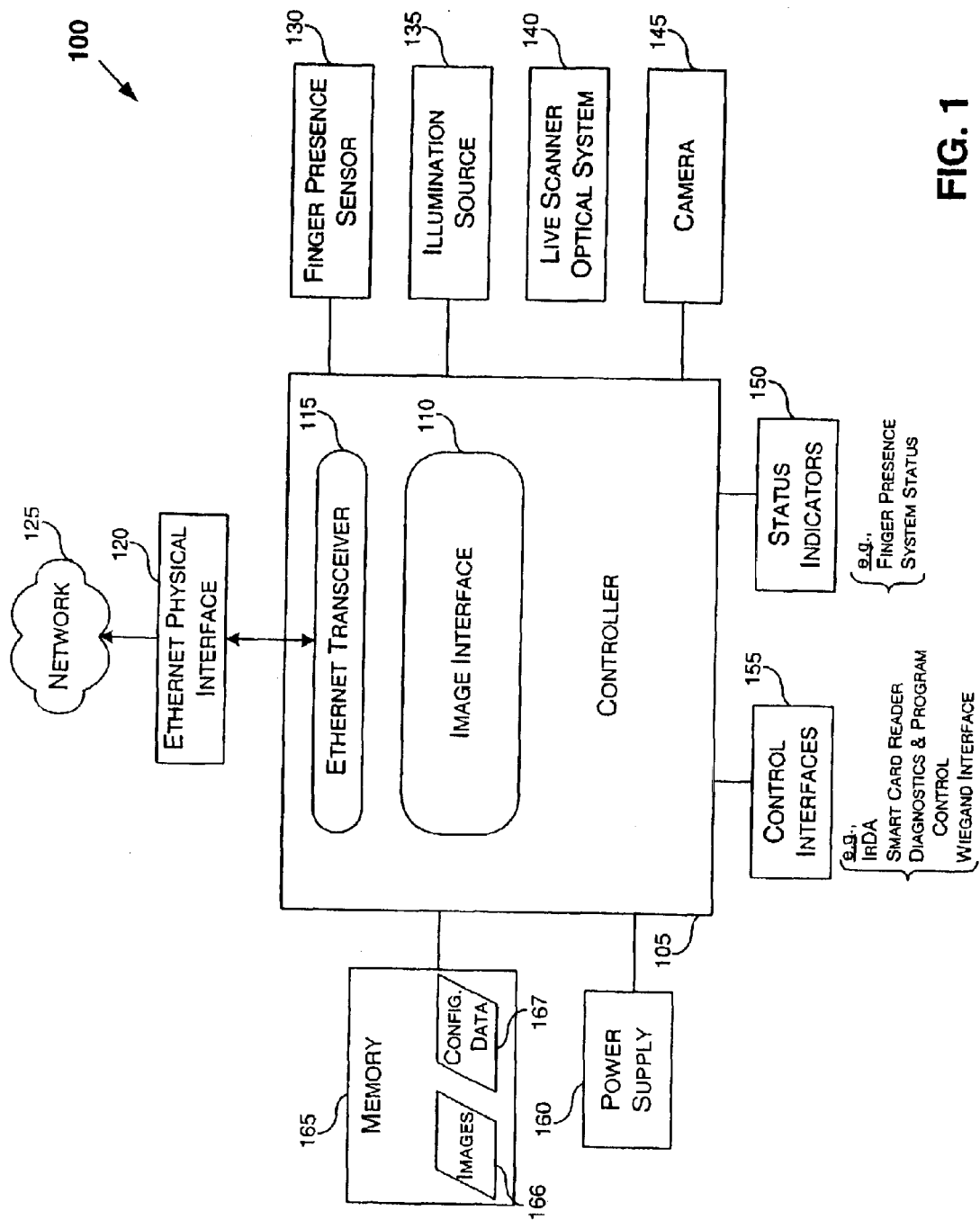
FIG. 1 is a diagram of a web-enabled live scanner according to an embodiment of the present invention.

FIG. 1 illustrates web-enabled live scanner 100, according to an embodiment of the present invention. Web-enabled live scanner 100 comprises controller 105, physical Ethernet interface 120, finger presence sensor 130, illumination source 135, live scanner optical system 140, camera 145, set of status indicators 150, set of control interfaces 155, power supply 160 and memory device 165. Additionally, image interface 110 and Ethernet transceiver 115 reside within controller 105.

Controller 105 controls the overall operation of web-enabled live scanner 100. Image interface 110 exists within controller 105. Image interface 110 may be implemented in software, hardware, firmware, or any combination thereof. Image interface 110 enables controller 105 to effectively communicate over a web connection through network 125 to other devices enabling them to control web-enabled live scanner 100 and for control and display of images via a client browser. Image interface 110 also enables controller 105 to manage and process the raw data of the captured fingerprint images. Also, residing within controller 105 is Ethernet transceiver 115 that processes, encodes and decodes messages transmitted and received over Ethernet interface 120.

Controller 105 controls the operation of the active optical devices used to capture fingerprint image raw data. The active imaging devices include finger presence sensor 130, illumination source 135, and camera 145. Electrical interfaces exist between controller 105 and finger presence sensor 130, illumination source 135 and camera 145 that allow controller 105 to manage and monitor their operation. FIG. 2 provides more detailed descriptions of the passive and active optical devices.

Web-enabled live scanner 100 also contains memory device 165 that stores among other information, image data 166 and configuration data 167. Image data 166 contains formatted data files of captured fingerprint or other biometric images, while configuration data 167 contains data and programs relating to the system configuration parameters that may be adjusted by the end user.

Controller 105 may be accessed and/or controlled by means other than a client browser through a set of control interfaces 155. Control interfaces 155 are optional. In one example, control interfaces 155 include an infrared IrDA interface, a smart card reader, and a diagnostic and program control interface. A Wiegand interface can also be used. In addition to control interfaces 155, controller 105 has a set of status indicators 150 that provide either visible or audible indications of the presence of a finger on finger presence sensor 130 and overall system status.

Power supply 160 provides power to all active devices within web-enabled live scanner 100 and is managed by controller 105 over an electrical interface.

Exemplary embodiments of a web-enabled live scanner of the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 2A:
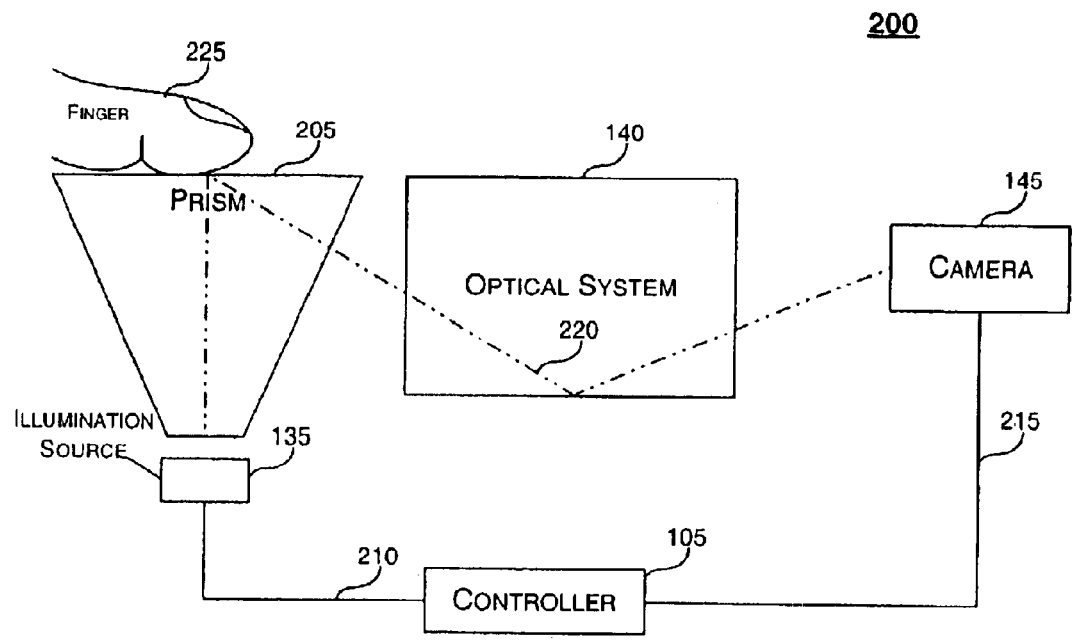
FIG. 2a is a diagram of the optical components of a web-enabled live scanner according to an embodiment of the present invention.

FIG. 2a illustrates the optical devices of web-enabled live scanner 100 used to capture an image, along with their relationship to controller 105, according to an embodiment of the present invention. The optical devices used to capture an image comprise illumination source 135, optical prism 205, optical system 140 and camera 145.

Controller 105 has electrical interfaces between illumination source 135 and camera 145. Using electrical interface 210, controller 105 may, among other functions, control illumination source 135 by turning it on and off, and adjusting its intensity. Using electrical interface 215, controller 105 may also control the camera functions and retrieve image raw data from camera 145.

Upon being activated, illumination source 135 emits light beam 220 that travels through optical prism 205 until it is reflected off the image being captured, which in this embodiment is fingerprint 225. In general, any type of print can be detected. Upon being reflected from fingerprint 225, the light beam 220 travels through optical system 140. Optical system 140 comprises a series of lens and mirrored surfaces that focus light beam 220 and direct it to camera 145. Camera 145 receives the reflected light beam and creates a file of the raw data for the captured image. The raw data may then be accessed by controller 105 over electrical interface 215.

Exemplary embodiments of the optical devices of a web-enabled live scanner of the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 2B:
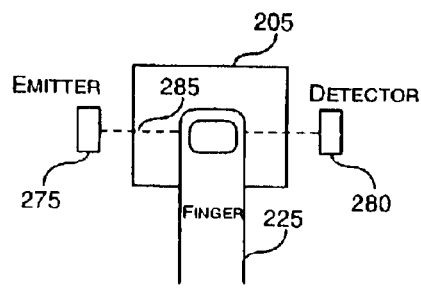
FIG. 2b is a diagram of a finger presence sensor of a web-enabled live scanner according to an embodiment of the present invention.

FIG. 2b illustrates finger presence sensor 130, according to an embodiment of the present invention. Finger presence sensor 130 includes an emitter 275 and a detector 280.

Emitter 275 emits light signal 285 to detector 280. Emitter 275 is located adjacent and external to one side of the optical prism 205 surface. Detector 280 is located adjacent and external to the opposite side of the optical prism 205 surface. Emitter 275 and detector 280 are positioned such that if a finger is placed on the optical prism 205 surface that light signal 285 would be blocked from reaching detector 280.

Upon finger 225 being placed upon the optical prism 210 surface and preventing light signal 285 from reaching detector 280, detector 280 provides a signal to controller 105 that the presence of a finger has been detected.

Exemplary embodiments of a finger presence sensor of the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 3:
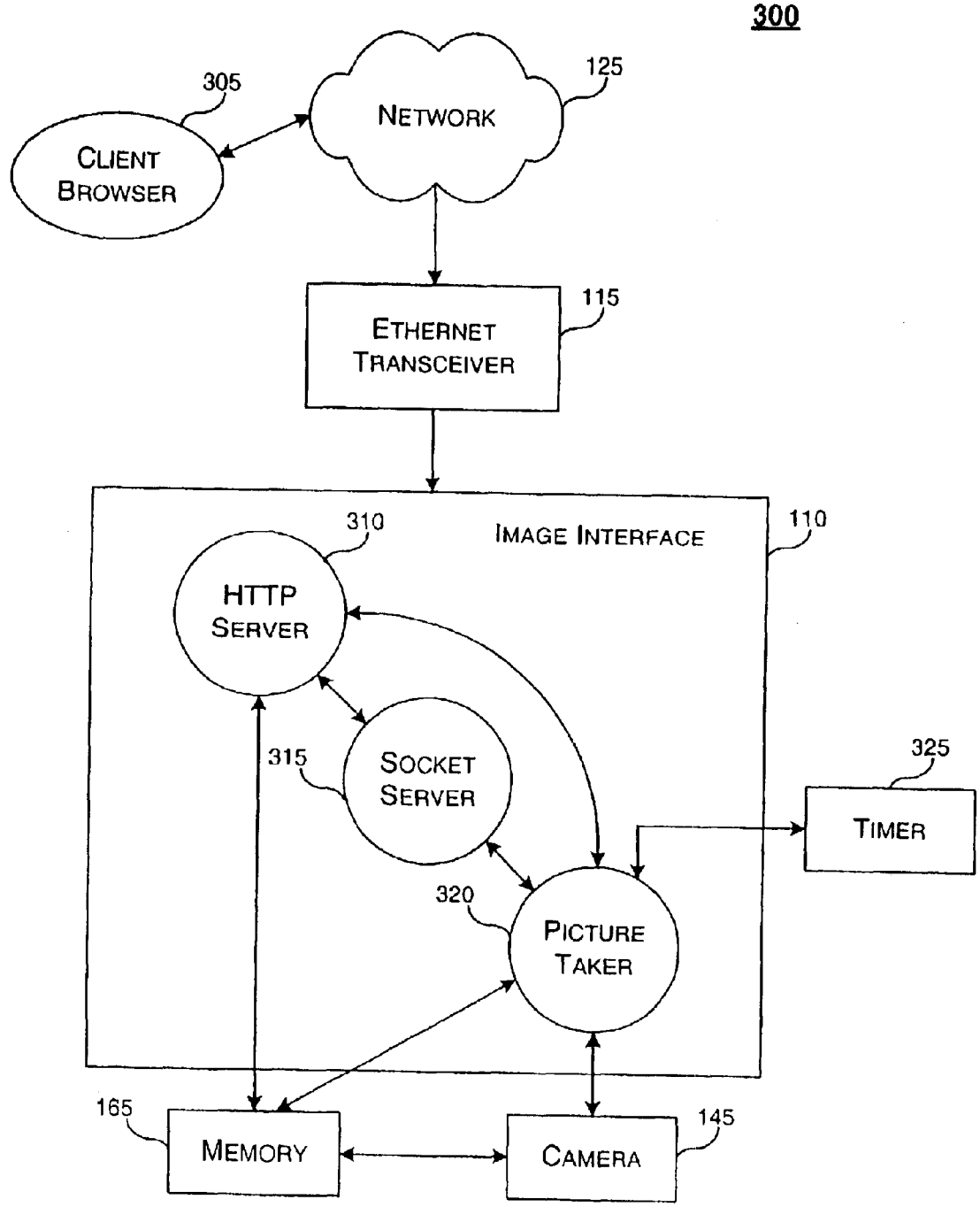
FIG. 3 is a diagram of the image interface of a web-enabled live scanner according to an embodiment of the present invention.

FIG. 3 illustrates image interface 110 according to an embodiment of the present invention. Image interface 110 includes Hypertext Transport Protocol (HTTP) server 310, socket server 315 and picture taker 320. Image interface 110 has interfaces to timer 325, camera 145, memory device 165 and Ethernet transceiver 115.

HTTP server 310 and socket server 315 components enable controller 105 to effectively communicate over an a web connection through network 125 to other devices for control of web-enabled live scanner 100 and for control and display of images through a client browser. In one embodiment, web-enabled live scanner 100 is Ethernet ready. Image interface 110 is coupled to network 125 through an Ethernet connection supported by Ethernet transceiver 115 and Ethernet physical interface 120. Picture taker software 320 enables controller 105 to manage and process the raw data of the captured fingerprint images. Timer 325 provides an adjustable means to specify the time interval between notifications from picture taker 320 to camera 145 that the camera may take another image.

Exemplary embodiments of an image interface of the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Method for Controlling a Web-Enabled Live Scanner

Figure 4:
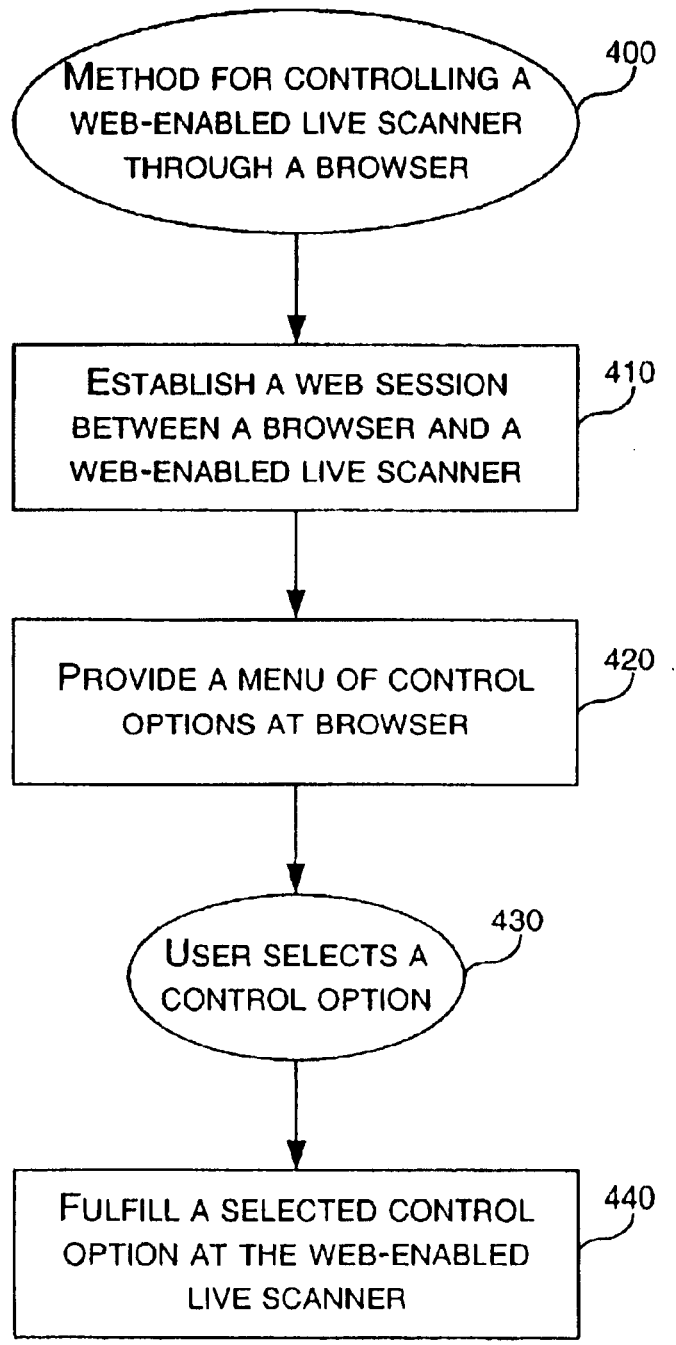
FIG. 4 is a flowchart diagram that shows a method for controlling a web-enabled live scanner through a browser according to an embodiment of the present invention.

The process illustrated in FIG. 4 presents a method for controlling web-enabled live scanner 100 through computer browser 305. The process begins with step 410. In step 410, a web session is established between browser 305 and web-enabled live scanner 100. In step 420, menu 510 on browser 305 appears and provides the control options for web-enabled live scanner 100. In step 430, the user of web-enabled live scanner 100 selects a control option. In step 440, the selected control option is fulfilled at web-enabled live scanner 100.

Additional steps or enhancements to the above steps known to person skilled in the relevant art(s) from the teachings herein are also encompassed by the present invention.

Figure 5:
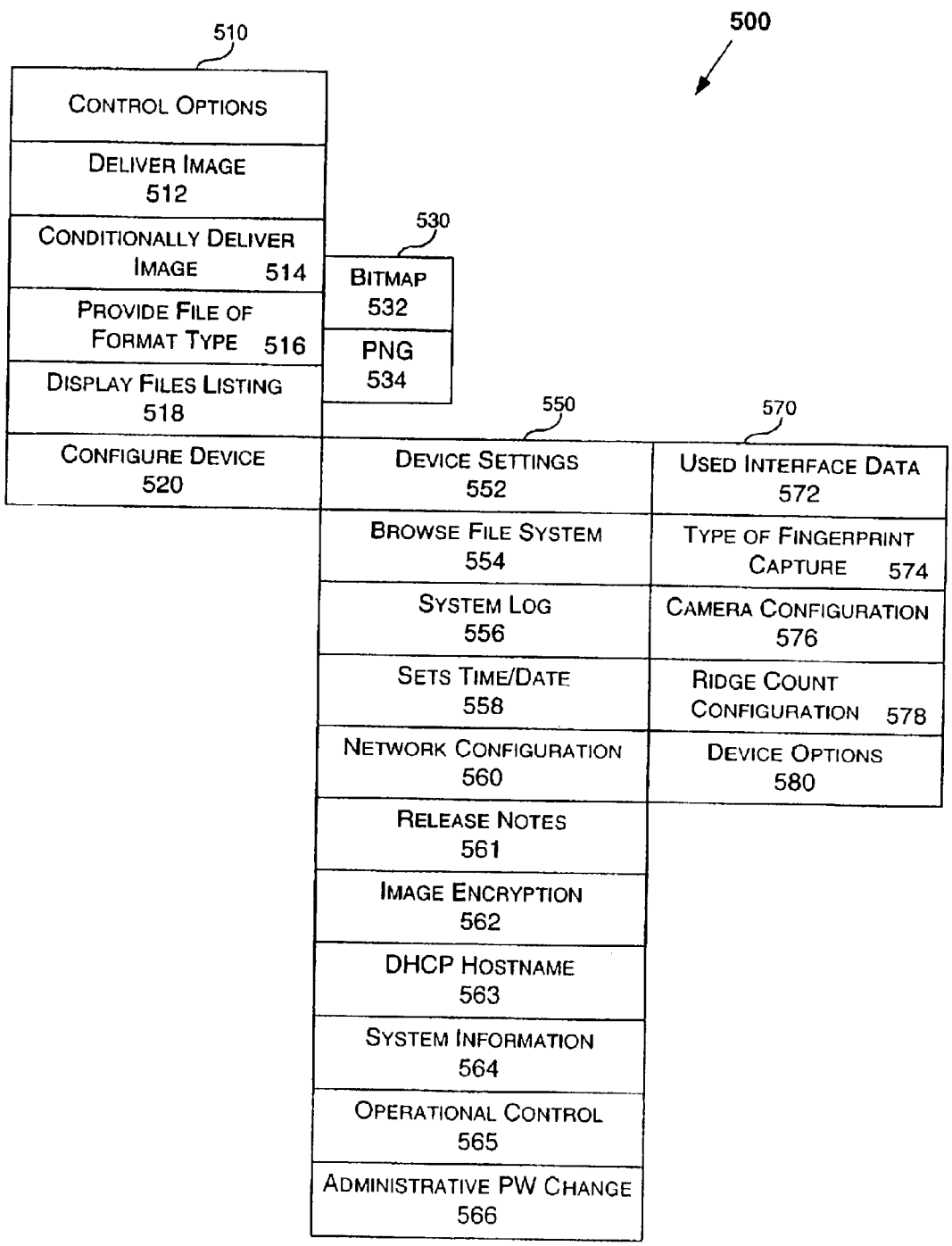
FIG. 5 is a diagram of the control option menu and sub-menus that appear on a browser for controlling a web-enabled live scanner according to an embodiment of the present invention.

FIG. 5 illustrates control options 500 that appear within browser 305 to enable an end user to control web-enabled live scanner 100, according to an embodiment of the present invention. Browser control options 500 comprise a main menu 510 and three sub-menus: File format sub-menu 530, device configuration sub-menu 550 and device settings sub-menu 570.

Each rectangle in FIG. 5 depicts a selectable control option that may be implemented in text, an icon or other graphical representation within browser 305. When an end user selects one of the options, browser 305 requests that web-enabled live scanner 100 performs the selected command or displays the control options associated with that control option category. An end user may or may not have the capability to adjust the control option setting depending on the control option category.

Main menu 510 comprises five control options: deliver image control option 512, conditionally deliver image control option 514, provide file of format type control option 516, display files listing control option 518, and configure device control option 520.

Upon selection of deliver image control option 512, browser 305 launches a request to web-enabled live scanner 100 to display the most recently captured image within browser 305.

Upon selection of conditionally deliver image control option 514, browser 305 launches a request to web-enabled live scanner 110 to display the image of a live fingerprint currently resting on the web-enabled live scanner 110, subject to certain conditions.

Upon selection of provide file of format type control option 516, browser 305 displays file format sub-menu 530. File format sub-menu 530 comprises two control option choices: bitmap control option 532 and PNG control option 534. Upon selection of one of these control options, browser 305 launches a request to the web-enabled live scanner 100 to display images in the selected file format.

Upon selection of display files listing control option 518, browser 305 displays a listing of all files currently stored within memory 165. An end user may display the stored image within browser 305 by selecting the file of interest.

Upon selection of configure device control option 520, browser 305 displays the device configuration sub-menu 550.

Device configuration sub-menu 550 comprises eleven control options: device settings control option 552, browse file system control option 554, system log control option 556, set time/date control option 558, network configuration control option 560, release notes control option 561, image encryption control option 562, DHCP hostname control option 563, system information control option 564, operational control control option 565, and administrative PW change control option 566.

Upon selection of browse file system control option 554, browser 305 displays a directory of all files (ie., image, data and other control files) residing in memory 165. The directory provides size, location, read/write protection levels and save date for the files displayed.

Upon selection of system log control option 556, browser 305 displays a record of all activity to software, file image capture and use of the web-enabled live scanner 100. The system log display includes date and time of activity, the software version that was impacted and notes regarding the type of activity.

Upon selection of the set time/date control option 558, browser 305 displays the current date and time, and allows the end user to enter changes to the date and time.

Upon selection of the network configuration control option 560, browser 305 displays the IP addresses associated with web-enabled live scanner 100, the network and gateway. In addition broadcast and netmask IP addresses are displayed. Browser 305 also displays the designations for the hostname, domain name and nameserver. The end user may modify certain of these variables depending on the network configuration.

Upon selection of the release notes control option 561, browser 305 displays the release version for all software modules that reside in web-enabled live scanner 100.

Upon selection of the image encryption control option 562, browser 305 displays a menu that enables the end user to enter an optional encryption key code to be used if file image data is to be encrypted.

Upon selection of the DHCP hostname control option 563, browser 305 displays the settings used for the DHCP process and enables the user to adjust those parameters. The end user may save the selected parameters into a file.

Upon selection of the system information control option 564, browser 305 displays the serial number and other identifying information about web-enabled live scanner 100.

Operational control control option 565 provides browser buttons that enable the end user to start, stop or reboot web-enabled live scanner 100 through browser 305.

Administrator Password Change control option 566 provides a mechanism to enable the end user to change the system password.

Upon selection of device settings control option 552, browser 305 displays the device settings sub-menu 570. Device settings sub-menu 570 comprises user interface data control option 572, type of fingerprint capture control option 574, camera configuration control option 576, ridge count configuration control option 578 and device options control option 580.

Upon selection of user interface data control option 572, browser 305 displays the user interface settings and permits the end user to adjust the settings. The settings include sounding an alert on a good fingerprint scan, sounding an alert on a bad fingerprint scan and playing sound at the start-up of web-enabled live scanner 100.

Upon selection of type of fingerprint capture control option 574, browser 305 displays the fingerprint capture settings and permits the end user to adjust the settings. The settings include selecting how to normalize the fingerprint image and what format to use to save the image.

Upon selection of camera configuration control option 576, browser 305 displays the camera configuration settings and permits the end user to adjust the settings. The settings include bad image count threshold, contrast, gain, integration time, and illumination level.

Upon selection of ridge count configuration control option 578, browser 305 displays the number of fingerprint ridges on a line before a fingerprint is examined and permits the end user to adjust the setting.

Upon selection of device options control option 580, browser 305 displays various device options and permits the user to adjust the settings. The settings include whether the image should be flipped horizontally, whether the image should be flipped vertically, whether the image should be inverted, whether to use the finger sensor, whether decimated images should be saved, number of measured horizontal dots per inch, and whether web-enabled live scanner 100 should up sample images.

Exemplary embodiments of the browser control options of the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Image Delivery Techniques

Figure 6A:
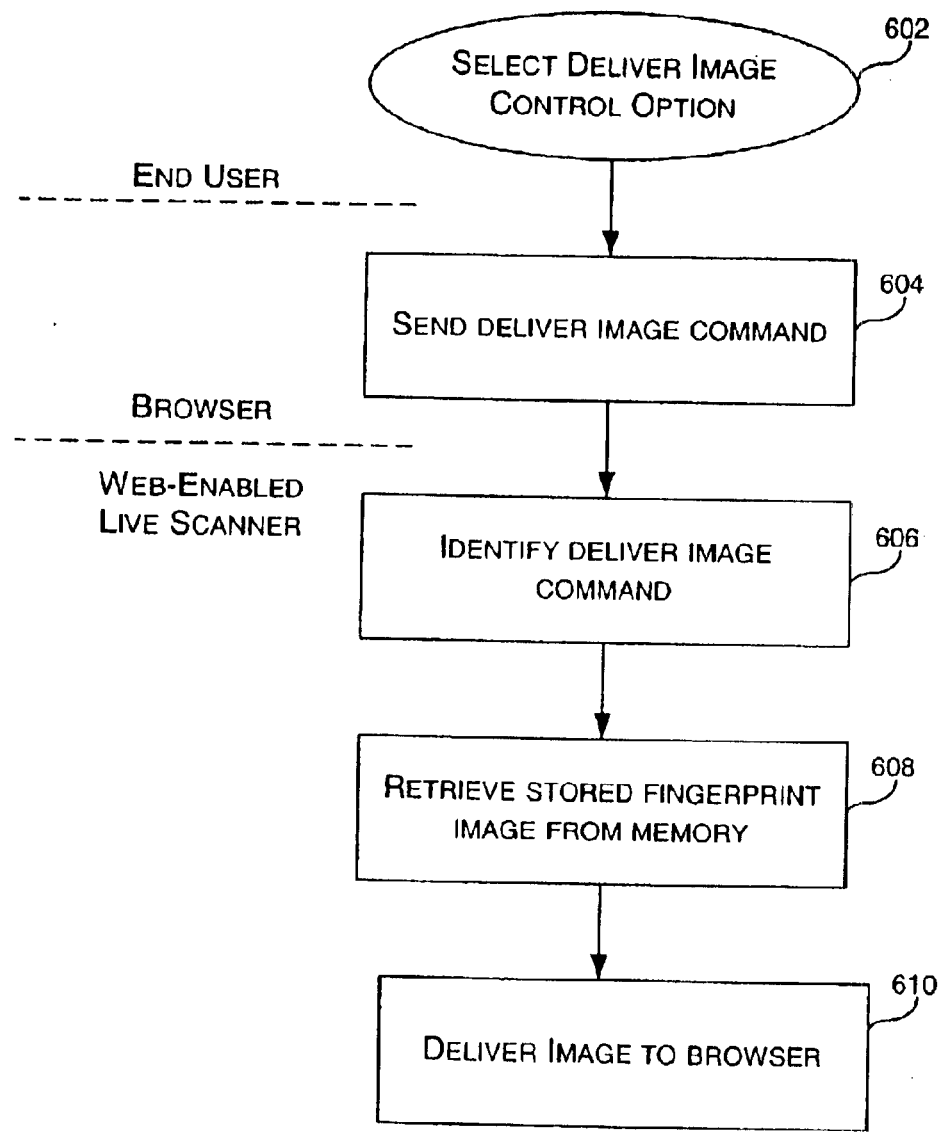
FIG. 6a is a flowchart diagram that shows a method for delivering an image from the web-enabled live scanner to a computer browser according to an embodiment of the present invention.

The process illustrated in FIG. 6a presents a method for retrieving an image from web-enabled live scanner 100 through the use of computer browser 305 when the image has already been stored in memory 165. The process begins in step 602. In step 602, an end user selects deliver image control option 512 appearing on computer browser 305. In step 604, browser 305 recognizes the end user command and sends a deliver image command selection to web-enabled live scanner 100. In step 606, upon receipt of the command web-enabled live scanner 100 recognizes that it has received a command function and determines that the command is the deliver image command. In step 608, web-enabled live scanner 100 retrieves the requested stored fingerprint image from memory 165. In step 610, web-enabled live scanner 100 delivers the image to computer browser 305.

Additional steps or enhancements to the above steps known to person skilled in the relevant art(s) from the teachings herein are also encompassed by the present invention.

Figure 6B:
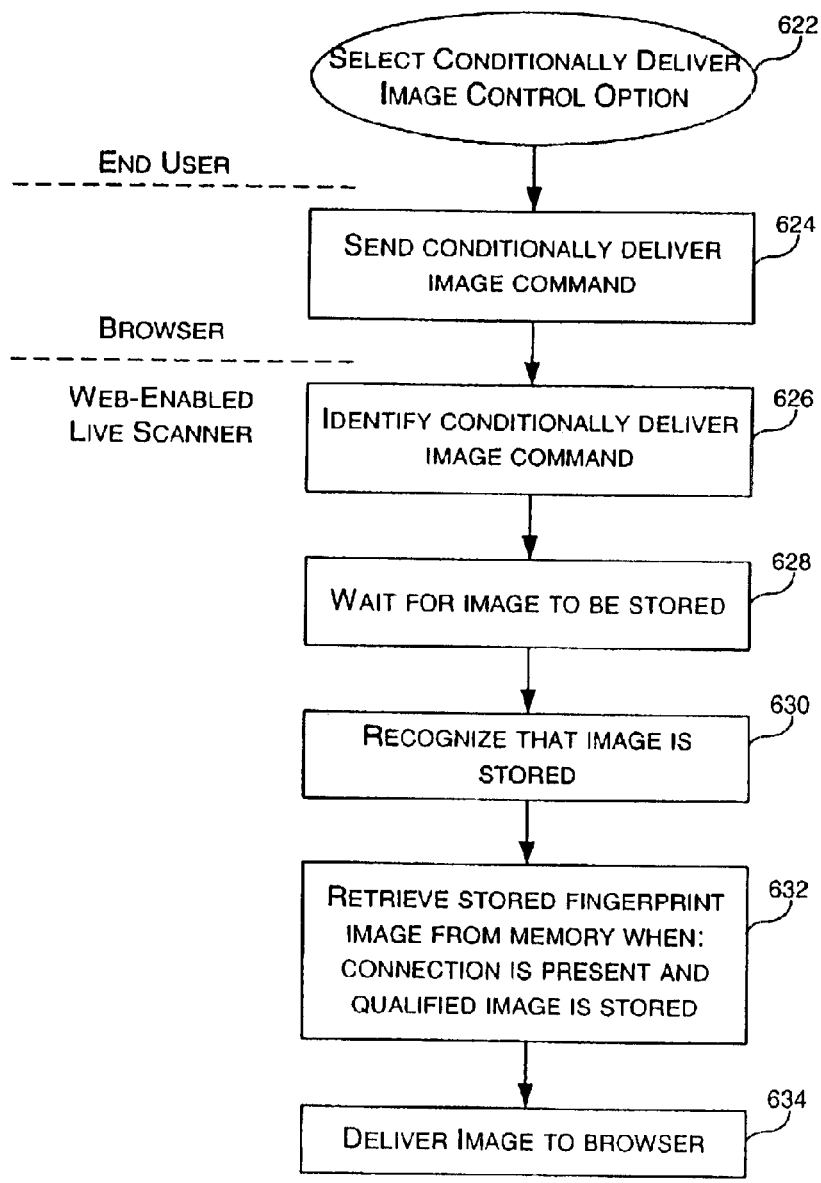
FIG. 6b is a flowchart diagram that shows a method for conditionally delivering an image from the web-enabled live scanner to a computer browser according to an embodiment of the present invention.

The process illustrated in FIG. 6b presents a method for retrieving an image from web-enabled live scanner 100 through the use of computer browser 305 upon a qualified image being stored in memory 165. This scenario differs from the one illustrated in FIG. 6a in the following way. In the FIG. 6a scenario the image is already present in memory at the time the end user invokes a request for the image, referred to in that scenario as the deliver image command. Whereas, in the present scenario the image has not been stored into memory or there is not currently a socket server connection between web-enabled live scanner 100 and browser 305 when the user invokes a request for an image, referred to in this scenario as the conditionally deliver image command.

The process begins in step 622. In step 622, an end user selects the conditionally deliver image control option 514 appearing on computer browser 305. In step 624, browser 305 recognizes the end user command and sends a conditionally deliver image command to web-enabled live scanner 100. In step 626, upon receipt of the command web-enabled live scanner 100 recognizes that it has received a command function and determines that the command is the conditionally deliver image command. In step 628, web-enabled live scanner 100 waits until a qualified image is stored into image memory 165. In step 630, web-enabled live scanner 100 recognizes that the image is stored. In step 632, web-enabled live scanner 100 retrieves the requested stored fingerprint image or other type of biometric print image from memory 165. In step 634, web-enabled live scanner delivers the image to computer browser 305.

Additional steps or enhancements to the above steps known to person skilled in the relevant art(s) from the teachings herein are also encompassed by the present invention.

Figure 6C:
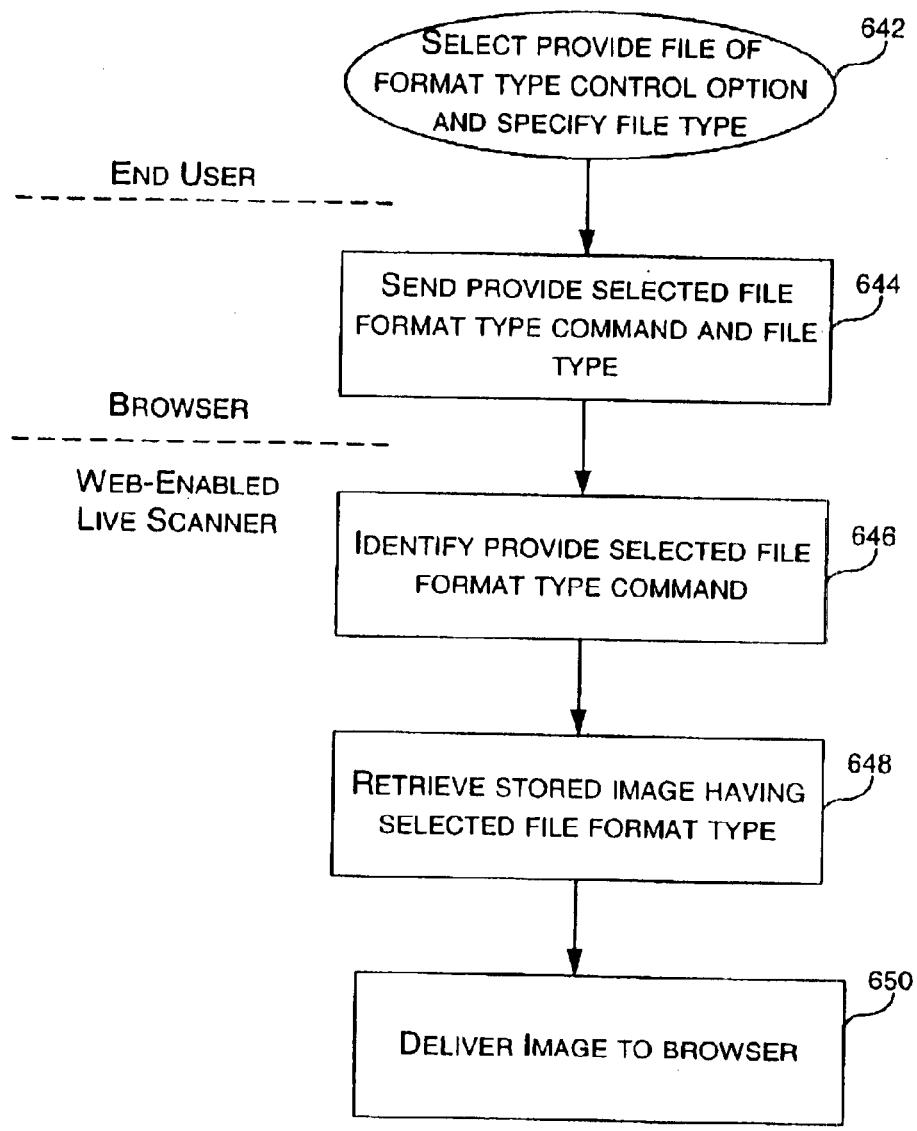
FIG. 6c is a flowchart diagram that shows a method for specifying a particular file type for a file to be retrieved from the web-enabled live scanner and delivered to a browser according to an embodiment of the present invention.

The process illustrated in FIG. 6c presents a method for specifying the file type of the image to be received by browser 305 from web-enabled live scanner 100.

The process begins in step 642. In step 642, an end user selects provide the file of format type control option 516 from computer browser 305 and specifies a particular file type for the image to be retrieved. In step 644, browser 305 recognizes the end user command and sends the file of format type control message containing the file type selected to web-enabled live scanner 100. In step 646, upon receipt of the command web-enabled live scanner 100 recognizes that it has received a command function and determines that the command is a request for a specific file type for the image being requested. In step 648, web-enabled live scanner 100 retrieves the stored image having the selected file format type. In step 650, web-enabled live scanner 100 delivers the image to computer browser 305.

Additional steps or enhancements to the above steps known to person skilled in the relevant art(s) from the teachings herein are also encompassed by the present invention.

Figure 6D:
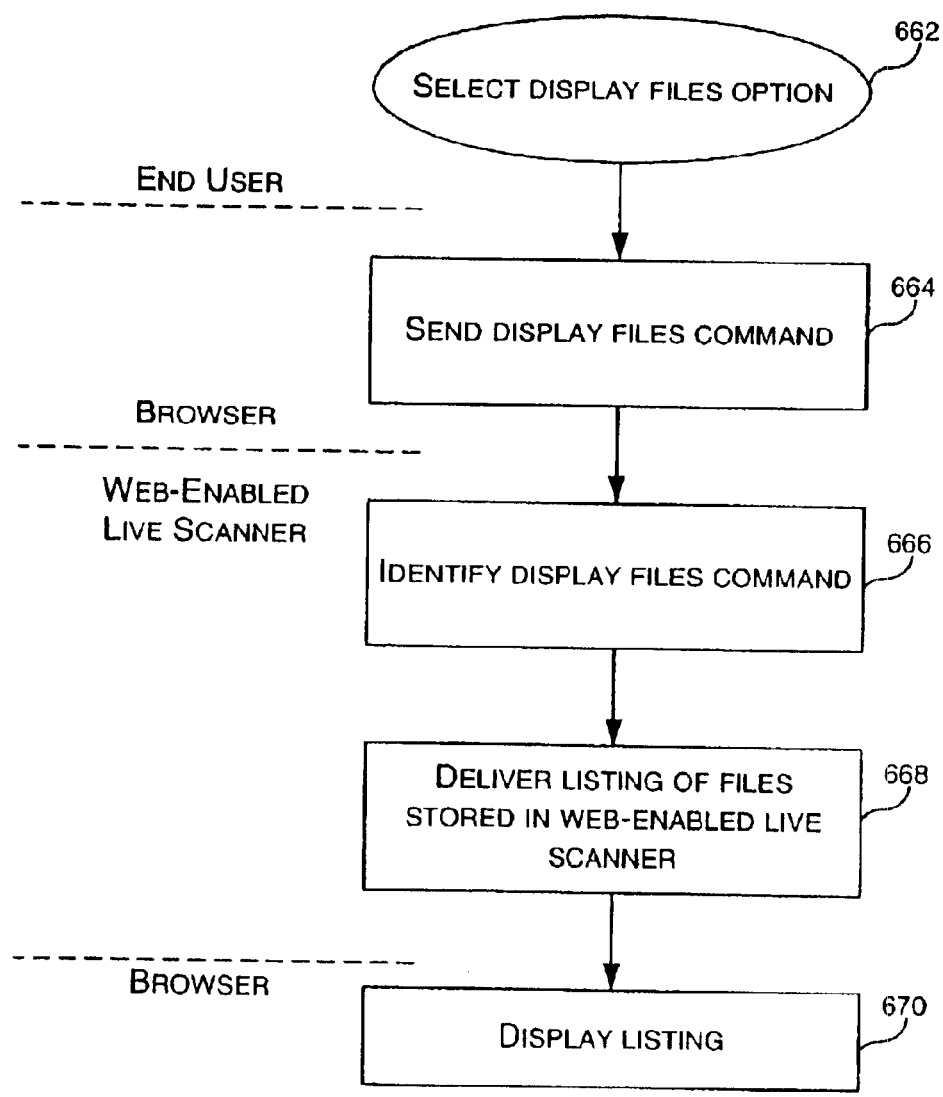
FIG. 6d is a flowchart diagram that shows a method for displaying the list of files stored in the web-enabled live scanner on a browser according to an embodiment of the present invention.

The process illustrated in FIG. 6d presents a method for displaying the list of image files stored in web-enabled live scanner 100.

The process begins in step 662. In step 662, an end user selects the display files listing control option 518 from the computer browser 305. In step 664, the browser 305 recognizes the end user command and sends the display file command to web-enabled live scanner 100. In step 646, upon receipt of the command web-enabled live scanner 100 recognizes that it has received a command function and determines that the command is a request to provide a listing of the image files currently stored in memory 165. In step 668, web-enabled live scanner 100 delivers the listing of the files stored in memory 165 to the browser 305.

Additional steps or enhancements to the above steps known to person skilled in the relevant art(s) from the teachings herein are also encompassed by the present invention.

Figure 6E:
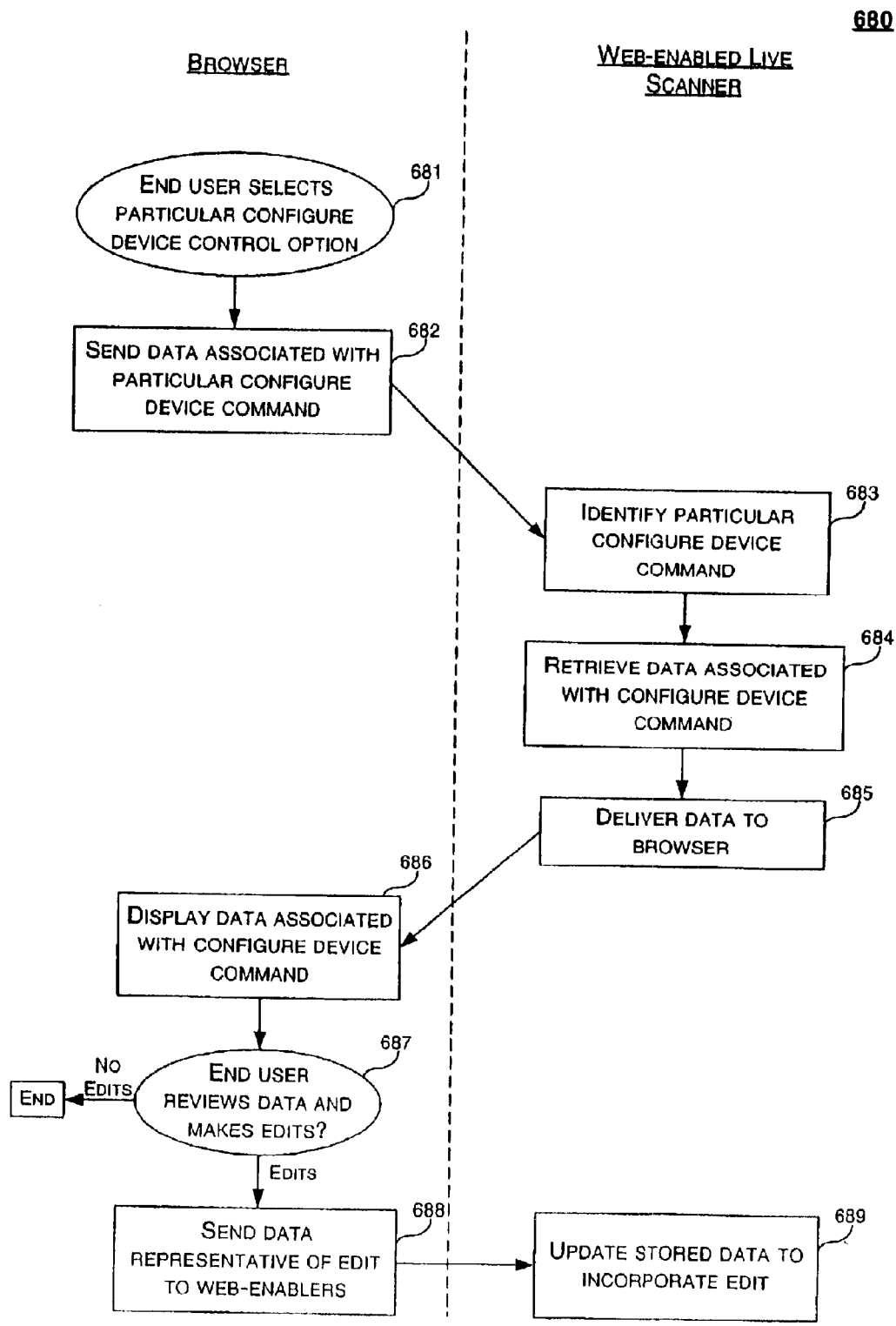
FIG. 6e is a flowchart diagram that shows a method for selecting and implementing a particular control option for the web-enabled live scanner through a browser according to an embodiment of the present invention.

The process illustrated in FIG. 6e presents a method for reviewing and modifying the control settings of web-enabled live scanner 100 from computer browser 305.

The process begins in step 681. In step 681, an end user selects a configure device control option, (e.g., set/time date control option 558) to be reviewed and/or modified. FIG. 5 provides further examples of configure device control options. In step 682, browser 305 recognizes the end user command and sends a request to web-enabled live scanner 100 to return the current settings and information associated with the particular configure device control option selected. In step 683, web-enabled live scanner 100 recognizes the request that it has received. In step 684, web-enabled live scanner 100 retrieves the data requested by the command. In step 685, web-enabled live scanner 100 delivers the requested data to browser 305. In step 686, browser 305 displays the data associated with the selected configure device command. In step 687, the end user reviews the data displayed, and may or may not input changes to the particular configuration settings or information that is displayed. In step 688, if the end user makes edits to the displayed information, browser 305 delivers the changes for the selected device configuration option to web-enabled live scanner 100. In step 689, web-enabled live scanner 100 recognizes the requested changes and updates the configuration settings or information to reflect the information entered by the end user.

Additional steps or enhancements to the above steps known to persons skilled in the relevant art(s) from the teachings herein are also encompassed by the present invention.

Figure 7A:
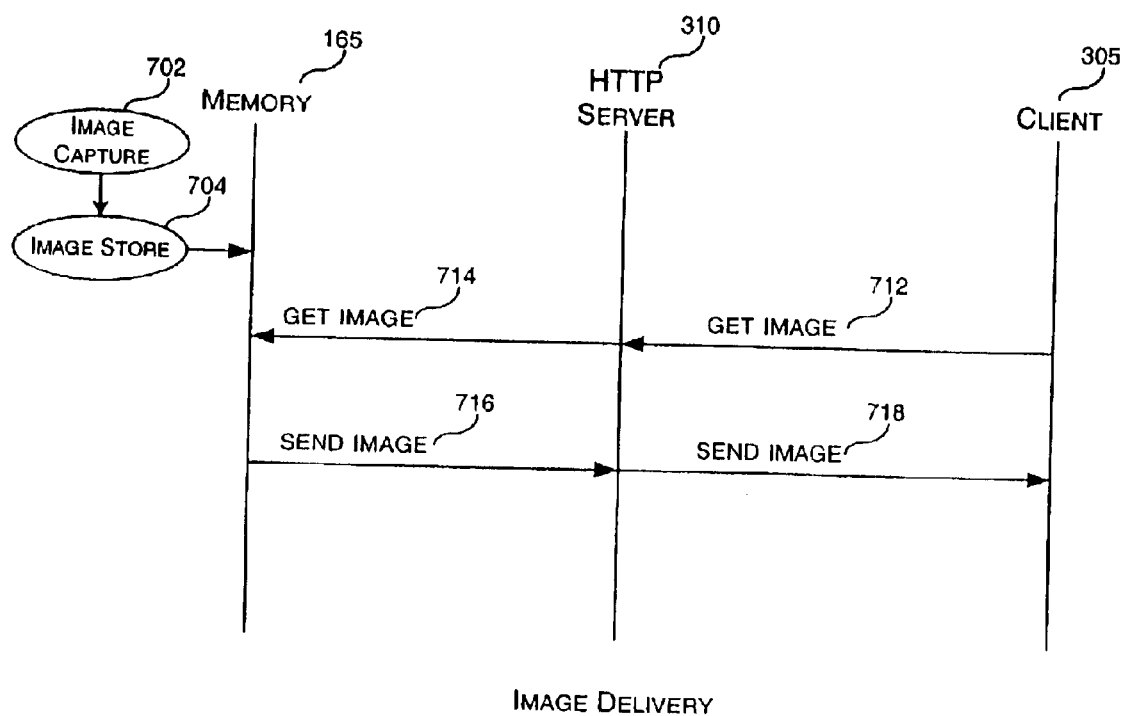
FIG. 7a is a signaling diagram that shows a message flow between elements of the web-enabled live scanner to capture and deliver an image to the browser according to an embodiment of the present invention.

The diagram illustrated in FIG. 7a shows the message and data flow between web-enabled live scanner 100 components to retrieve an image using deliver image command 512 invoked from computer browser 305. This message flow occurs when an end user is aware that an image has been captured by web-enabled live scanner 100 and the end user seeks to display the image on browser 305.

The message flow begins in step 712. In step 712, client browser 305 sends get image message 712 to HTTP server 310. In step 714, HTTP server 310 sends get image message 714 to memory 165. Prior to the end user requesting that client browser 305 send get image message 712, an image was captured in step 702 and stored in step 704 in memory 165. In step 716, memory 165 sends the image to HTTP Server 310. In step 718, HTTP Server 310 sends the image to browser 305.

Additional steps or enhancements to the above steps known to persons skilled in the relevant art(s) from the teachings herein are also encompassed by the present invention.

Figure 7B:
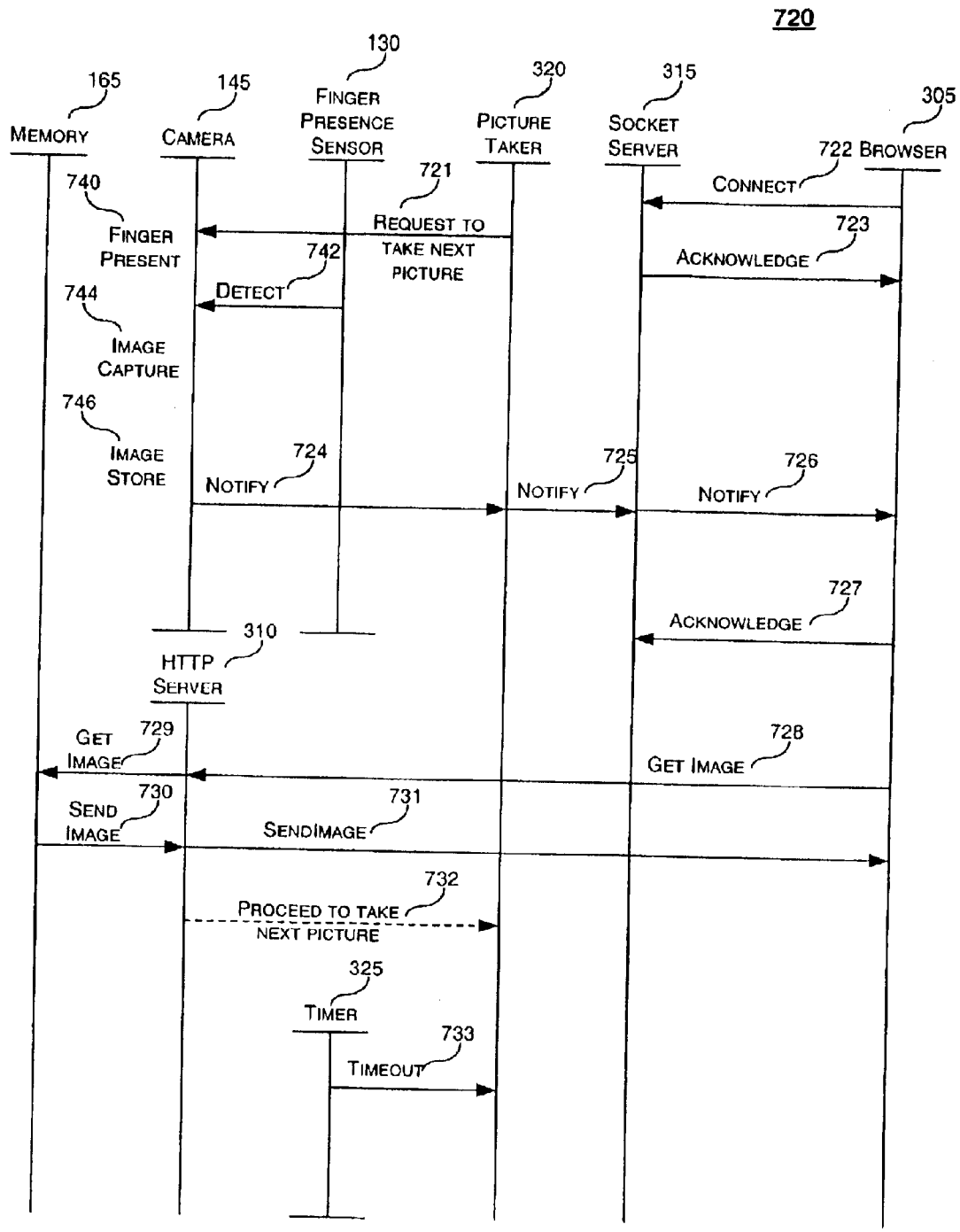
FIG. 7b is a signaling diagram that shows a message flow between elements of the web-enabled live scanner to capture and conditionally deliver an image to the browser using a socket connection according to an embodiment of the present invention.

The diagram illustrated in FIG. 7b shows the message and data flow between web-enabled live scanner 100 components to retrieve an image using conditionally deliver image command 514 invoked from computer browser 305. This message flow occurs when an end user is currently capturing fingerprint images with web-enabled live scanner 100 that the user seeks to display on browser 305 and a socket server connection exists.

The message flow begins in step 722. In step 722, browser 305 sends connect message 722 to socket server 315. In step 723, socket server 315 sends acknowledge message 723 to browser 305 to establish a socket connection. Independent of this action, in step 721, picture taker 320 sends request to take next picture message 721 to camera 145. Picture taker 320 will take this action at system start-up, or upon the receipt of timeout message 733 or override timer message 732. In step 740, a finger becomes present on the web-enabled live scanner 100. In step 742, the finger presence sensor 130 detects the presence of the finger and sends detect message 742 to camera 145. Upon receipt of detect message 742, camera 145 captures and stores the image in steps 744 and 746. Once the image is stored, camera 145 sends notify message 724 to picture taker 320. Picture taker 320 then sends notify message 725 to socket server 315. Socket server 315 then sends notify message 726 to browser 305. In step 727, browser 305 sends acknowledge message 727 to socket server 315 to acknowledge receipt of notify message 726.

In step 728, browser 305 sends get image message 728 to request that web-enabled live scanner 100 deliver the image to browser 305. Within get image message 728, browser 305 may provide a timer override request, which is explained below. In step 729, HTTP server 310 recognizes get image message 728 and sends get image message 729 to memory 165 to request that the image be delivered. Memory 165 recognizes the get image message and in step 730 sends the image to HTTP server 310. HTTP server 305 recognizes that it has received the image and in step 731 sends the image to browser 305.

At this point under normal operation picture taker 320 will not send request to take next picture command 721 until it receives timeout message 733 from timer 325. Timer 325 sends timeout message 733 after a specified duration of time. However, if in the process of sending get image message 728 browser 305 included an override timer request, then camera 145 will send a proceed to take next picture message 732 to picture taker 320 and the process of capturing another image will not be delayed.

Additional steps or enhancements to the above steps known to persons skilled in the relevant art(s) from the teachings herein are also encompassed by the present invention.

Figure 7C:
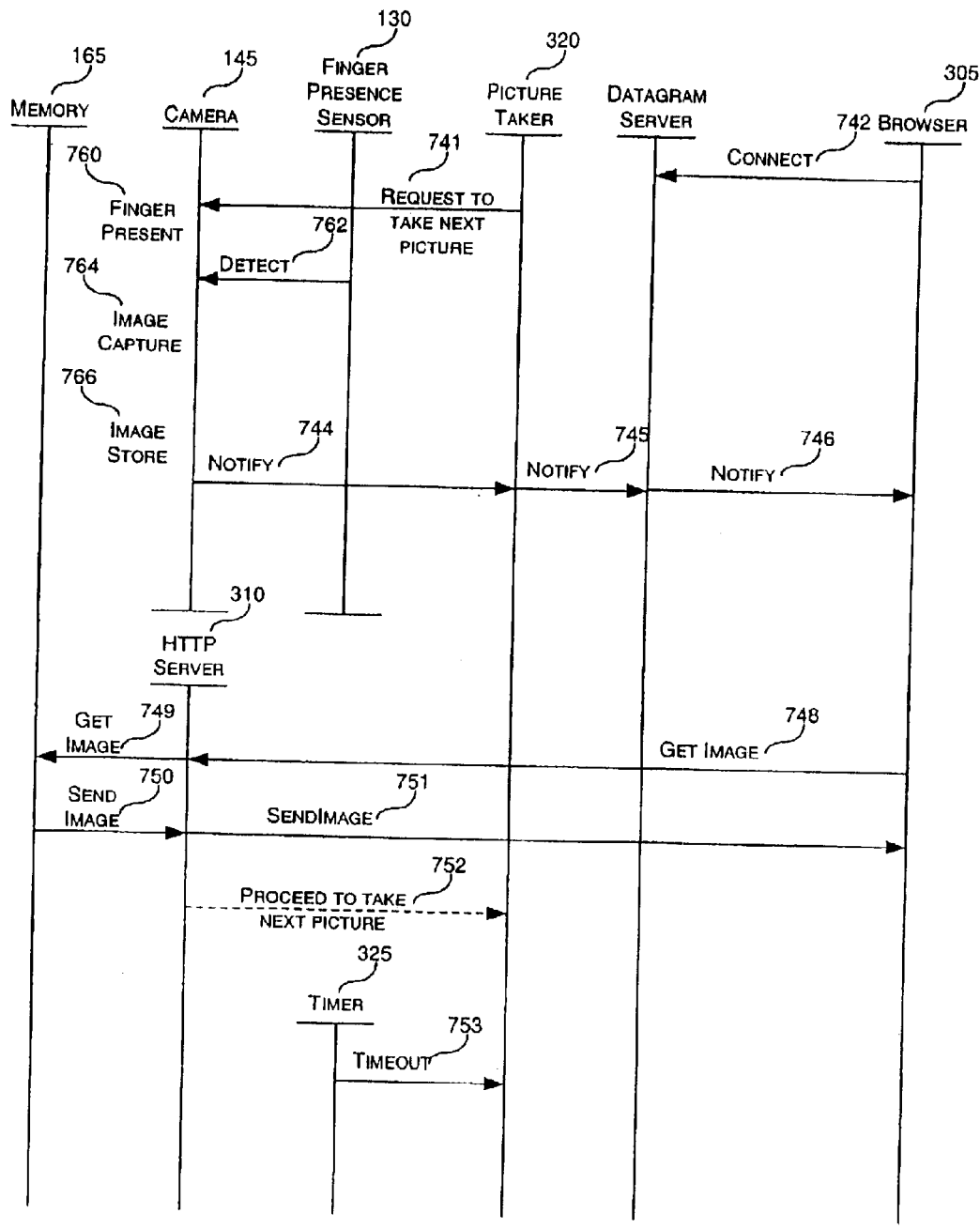
FIG. 7c is a signaling diagram that shows a message flow between elements of the web-enabled live scanner to capture and conditionally deliver an image to the browser using a datagram server according to an embodiment of the present invention.

The diagram illustrated in FIG. 7c shows the message and data flow between web-enabled live scanner 100 components to retrieve an image using conditionally deliver image command 514 invoked from computer browser 305. This message flow occurs when an end user is currently capturing fingerprint images with web-enabled live scanner 100 that the user seeks to display on browser 305 and a datagram server is used.

The message flow begins in step 742. In step 742, client browser 305 sends connect message 742 to a datagram server. Independent of this action, in step 741, picture taker 320 sends request to take next picture message 741 to camera 145. Picture taker 320 will take this action at system start-up, or upon the receipt of timeout message 753 or override timer message 752. In step 760, a finger becomes present on the web-enabled live scanner 100. In step 762, the finger presence sensor 130 detects the presence of the finger and sends detect message 762 to camera 145. Upon receipt of detect message 762, camera 145 captures and stores the image in steps 764 and 766. Once the image is stored, camera 145 sends notify message 764 to picture taker 320. Picture taker 320 then sends notify message 745 to datagram server. The datagram server then sends notify message 746 to browser 305.

In step 748, browser 305 sends get image message 748 to request that the web-enabled live scanner 100 deliver the image to browser 305. Within get image message 748, browser 305 may provide a timer override request, which is explained below. In step 749, HTTP server 310 recognizes get image message 748 and sends get image message 749 to memory 165 to request that the image be delivered. Memory 165 recognizes the get image message and in step 750 sends the image to HTTP server 310. HTTP server 305 recognizes that it has received the image and in step 751 sends the image to browser 305.

At this point under normal operation picture taker 320 will not send request to take next picture command 741 until it receives timeout message 753 from timer 325. Timer 325 sends timeout message 753 after a specified duration of time. However, if in the process of sending get image message 748 browser 305 included an override timer request, then camera 145 will send a proceed to take next picture message 752 to picture taker 320 and the process of capturing another image will not be delayed.

Additional steps or enhancements to the above steps known to persons skilled in the relevant art(s) from the teachings herein are also encompassed by the present invention.

Figure 8:
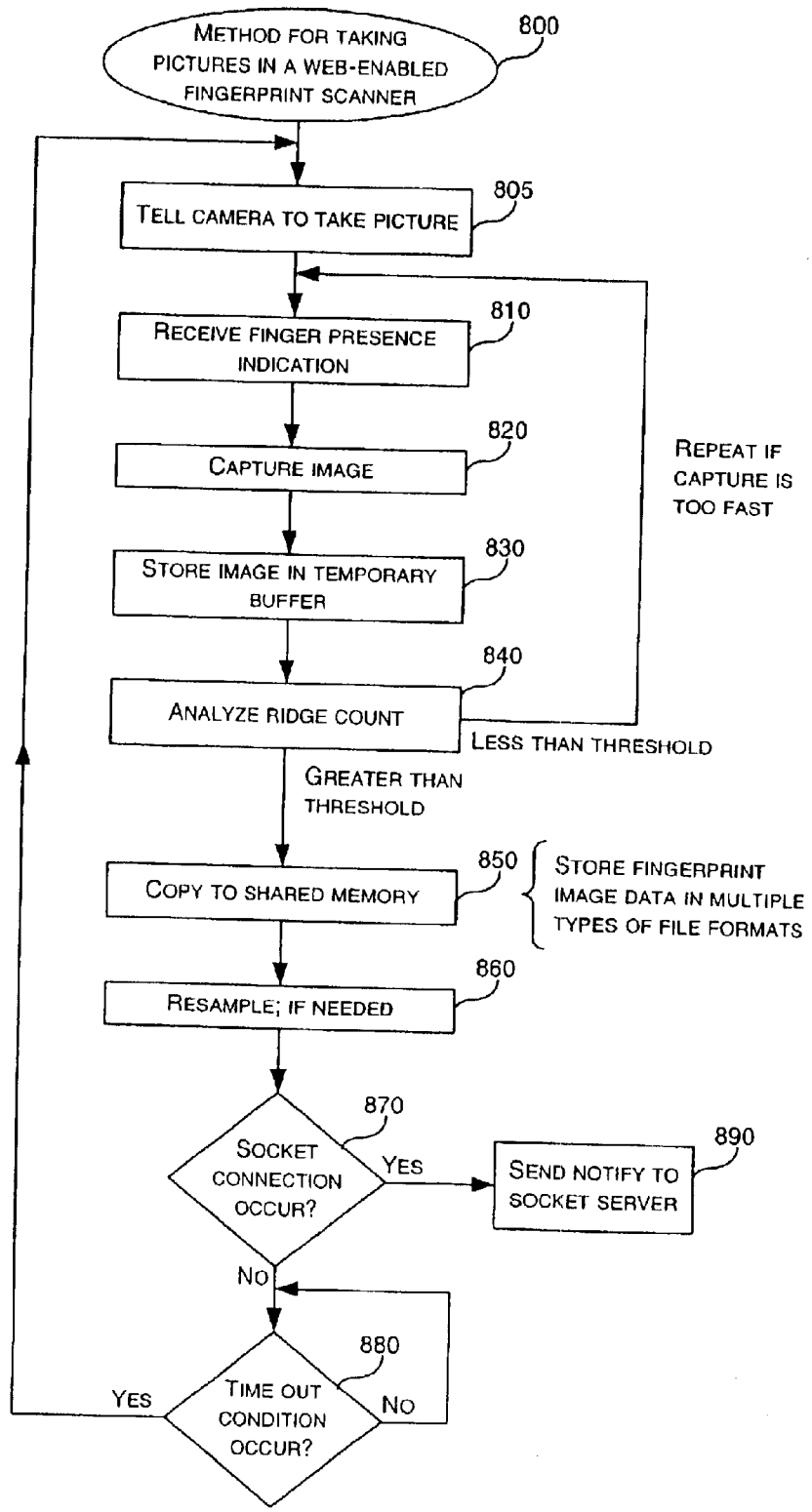
FIG. 8 is a flowchart diagram that shows a method for taking pictures in a web-enabled live scanner according to an embodiment of the present invention.

The process illustrated in FIG. 8 presents a method for capturing fingerprint images using a web-enabled live scanner.

The process begins in step 805. In step 805, web-enabled live scanner 100 receives a notification to prepare to take a picture of a fingerprint and tells camera 145 to take a picture. In step 810, web-enabled live scanner 100 receives a finger presence indication that a finger is present on the scanning surface of live scanner optical system 140. In step 820, web-enabled live scanner 100 captures an image of the fingerprint. In step 830, web-enabled live scanner 100 stores the captured image in a temporary buffer. In step 840, web-enabled live scanner 100 counts the number of ridges present in the fingerprint image to determine if they exceed a pre-set ridge count threshold. The ridge count threshold is set to ensure the quality of the image before processing of the captured raw data. If web-enabled live scanner 100 determines that the ridge count threshold was not exceeded, then it attempts to re-capture the fingerprint image by returning to step 810. If the ridge count threshold was exceeded, then the process moves onto step 850. In step 850, the raw data of the fingerprint image is converted into pre-selected file formats (e.g., bitmap or PNG) and stored into memory 165. In step 860, web-enabled live scanner 100 determines whether resampling may be necessary.

If no resampling is needed, then in step 870 web-enabled live scanner 100 determines whether a socket connection exists. If a socket connection does exist, then in step 890 a notify message is sent to socket server 315 to enable socket server 315 to notify browser 305 that an image is available for display. If a socket connection does not exist, then in step 880 web-enabled live scanner 100 determines whether a timeout condition has occurred. If the timeout has not occurred, web-enabled live scanner will wait until the timer expires. If the timeout has occurred, web-enabled live scanner will proceed to tell camera 145 to take another picture.

Additional steps or enhancements to the above steps known to persons skilled in the relevant art(s) from the teachings herein are also encompassed by the present invention.

Figure 9:
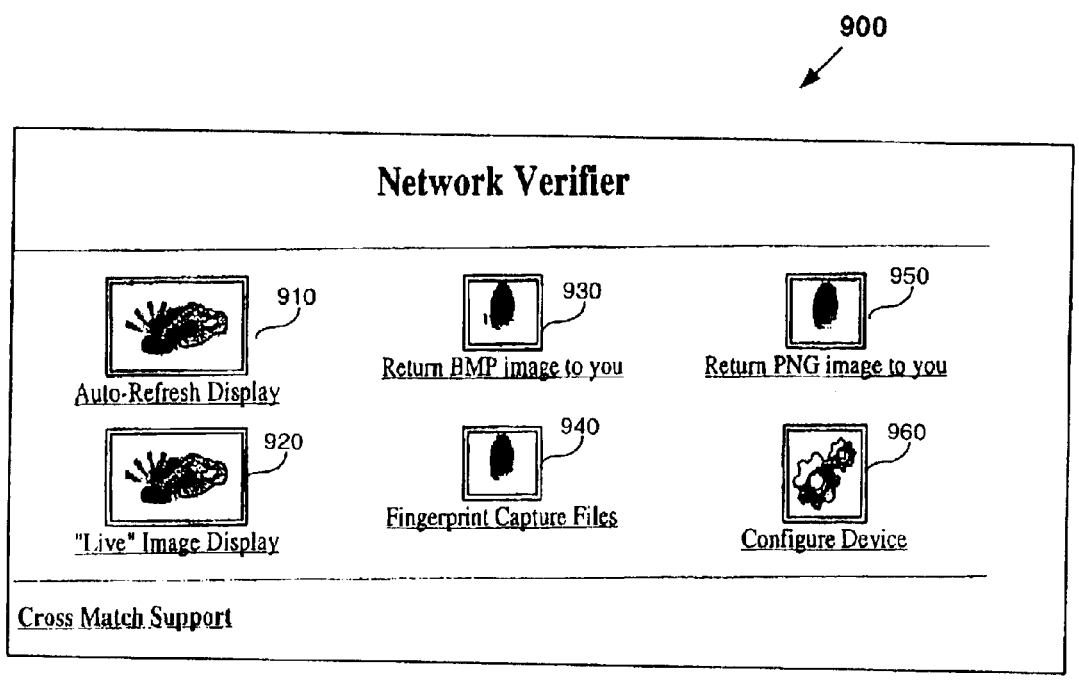
FIG. 9 is a browser screen shot that shows an implementation of the main control option menu used to control the web-enabled live scanner according to an embodiment of the present invention.

FIG. 9 depicts a computer screen shot 900 of an implementation of main menu 510. The icons in screen shot 1000 correspond to main menu 510 control options. Specifically, Auto-Refresh Display icon 910 corresponds to deliver image control option 512, "Live" Image Display icon 920 corresponds to conditionally deliver image control option 514, Return BMP image to you icon 930 corresponds to provide file of format type control option 516 with bitmap control option 532 selected, Fingerprint Capture Files icon 940 corresponds to display files listing control option 518, Return PNG image to you icon 950 corresponds to provide file of format type control option 516 with PNG control option 534 selected, and Configure Device icon 960 corresponds to configure device control option 520.

Exemplary embodiments of a main browser menu of the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 10:
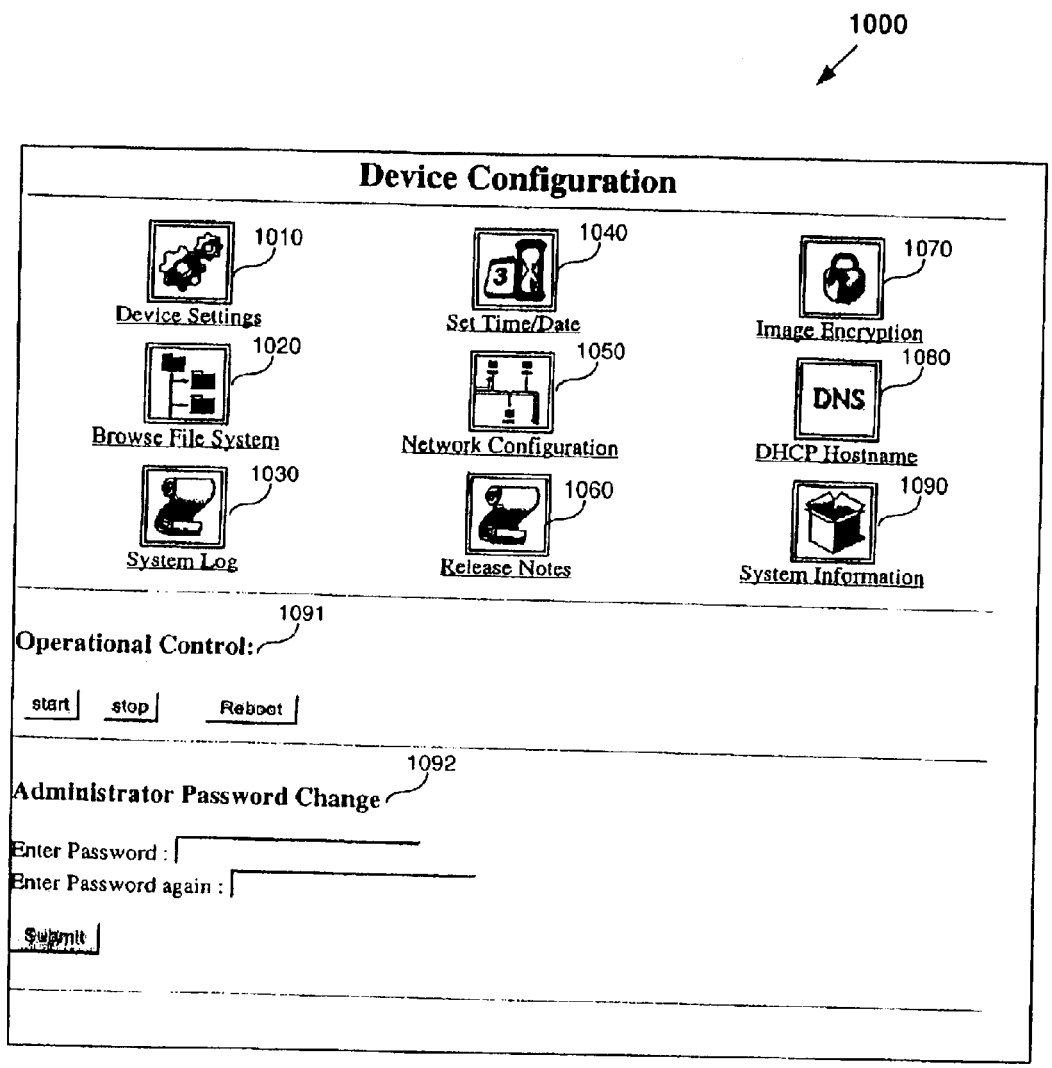
FIG. 10 is a browser screen shot that shows an implementation of the device configuration control option sub-menu used to control the web-enabled live scanner according to an embodiment of the present invention.

FIG. 10 depicts a computer screen shot 1000 of an implementation of sub-menu 550. The icons in screen shot 900 correspond to the main menu 510 control options. Specifically, Device Settings icon 1010 corresponds to device settings control option 552, Browse File System icon 1020 corresponds to browse file system control option 554, System Log icon 1030 corresponds to system log control option 556, Set Time/Date icon 1040 corresponds to set time/date control option 558, Network Configuration icon 1050 corresponds to network configuration control option 560, Release Notes icon 1060 corresponds to release notes control option 561, Image Encryption icon 1070 corresponds to image encryption control option 562, DHCP Hostname icon 1080 corresponds to DHCP hostname control option 563, System Information icon 1090 corresponds to system information control option 564, Operational Control icon 1091 corresponds to operational control control option 565, and Administrator Password Change 1092 corresponds to Administrative PW change option 566.

Exemplary embodiments of a sub-menu displayed on a browser for the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

FIG. 11 depicts device configuration computer screen shot 1100 of an implementation of the device settings control option 552. Device configuration computer screen shot 1100 includes user adjustable settings for the user interface, camera, print image processing and live scanner. The user interface settings include settings for toggling on or off a sound alert on an acceptable print scan, toggling on or off a sound alert on an unacceptable print scan and toggling on or off the playing of sounds at start up. The camera settings include settings for contrast, gain, and integration time. The print image processing settings include settings for ridge threshold, unacceptable image count, print image normalization and image orientation. The live scanner settings include settings for illumination level, and a finger sensor setting for toggling use of the finger sensor on or off. The live scanner settings include settings for selecting storage of different file formats, toggling on or off the capture of a rolled print, toggling on or off the upsampling of images and for inputting a measured horizontal resolution value.

Exemplary embodiments of a control option displayed on a browser for the present invention are described above. The present invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the present invention.

Further Example Implementations

Aspects of the present invention (for example, image interface 110) can be implemented in hardware, software, firmware, and/or combinations thereof, including, without limitation, gate arrays, programmable arrays ("PGAs"), fast PGAs ("FPGAs"), application-specific integrated circuits ("ASICs"), processors, microprocessors, microcontrollers, and/or other embedded circuits, processes and/or digital signal processors, and discrete hardware logic. The present invention is preferably implemented with digital electronics but can also be implemented with analog electronics and/or combinations of digital and analog electronics.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A live scanner that can be accessed over a network, comprising:
   a camera that detects print images of live fingerprints of an individual; and
   an image interface coupled to a browser over the network, wherein said image interface includes a web server that serves a menu of control options to the browser and fulfills at least one control option selected by a user at the browser,
   wherein the control options include a device settings configuration option, and wherein, in response to a user selecting the device settings configuration option at the browser, said web server sends data relating to at least one of user interface settings, camera settings, print image processing settings, and live scanner settings,
   wherein the device settings configuration option includes toggled functions that can be selected to be toggled on or off, and the toggled functions include a sound alert on an acceptable print scan, a sound alert on an unacceptable print scan, a play sound at start up, a finger sensor setting for toggling use of a finger sensor on or off, a capture of a rolled print setting for toggling on or off the capture of a rolled print, or an upsampling of images setting for toggling on or off the upsampling of images.

2. The live scanner of claim 1, wherein said web server comprises an HTTP server.

3. The live scanner of claim 1, wherein the control options include an unconditional image delivery control option, and wherein, in response to a user selecting the unconditional image delivery control option at the browser, said web server retrieves stored print image data representative of a detected print image and sends the retrieved print image data to the browser.

4. The live scanner of claim 1, wherein the control options include conditional image delivery control option, and wherein, in response to a user selecting the conditional image delivery control option at the browser, said web server retrieves print image data representative of a detected print image and sends the retrieved print image data to the browser only when at least one delivery condition has been met.

5. The live scanner of claim 4, wherein said at least one delivery condition includes a socket present condition and a finger present condition.

6. The live scanner of claim 1, wherein the control options include a provide file format option, and wherein, in response to a user selecting the provide file format option at the browser, said web server retrieves a file of print image data in a particular file format and sends the retrieved file to the browser.

7. The live scanner of claim 6, wherein said file includes a bitmap file or a png file.

8. The live scanner of claim 1, wherein the control options include a display files listing option, and wherein, in response to a user selecting the display files listing option at the browser, said web server retrieves data identifying a file of stored files in the live scanner and sends the retrieved data to the browser.

9. The live scanner of claim 1, wherein the control options include a configure device option, and wherein, in response to a user selecting the configure device option at the browser, said web server sends data relating to configuration of the live scanner to the browser.

10. The live scanner of claim 1, wherein the control options include a configure device option, and wherein, in response to a user selecting the configure device option at the browser, said web server sends data relating to a menu of device configuration options of the live scanner to the browser.

11. The live scanner of claim 10, wherein said device configuration options include at least one of the following configuration options: device settings, browse file system, system log, set time/date, network configuration, release notes, image encryption, host name, system information, operation control, and administrator password change.

12. The live scanner of claim 1, wherein the camera settings include settings for contrast, gain, and integration time.

13. The live scanner of claim 1, wherein the print image processing settings include settings for a ridge threshold and unacceptable image count threshold.

14. The live scanner of claim 1, wherein the print image processing settings include settings for print image normalization, image orientation.

15. The live scanner of claim 1, wherein the live scanner settings include an illumination level setting for setting an illumination level.

16. The live scanner of claim 1, wherein the live scanner settings include settings for selecting storage of different file format types.

17. The live scanner of claim 1, wherein the live scanner settings include a setting for toggling on or off the upsampling of images, and a setting for inputting a measured horizontal resolution value.

18. The live scanner of claim 1, further comprising:
an Ethernet physical interface; and
an Ethernet transceiver, whereby, said image interface is communicatively coupled to the network through said Ethernet transceiver and Ethernet physical interface.

19. The live scanner of claim 18, wherein said Ethernet physical interface comprises a 10BASE-T or 100BASE-T interface.

20. The live scanner of claim 1, further comprising: a finger sensor that senses the presence or absence of a finger on a platen of the live scanner.

21. The live scanner of claim 1, wherein said image interface includes a web server, a socket server, and a picture taker.

22. The live scanner of claim 21, wherein said socket server establishes a socket connection with the browser.

23. The live scanner of claim 22, wherein said camera detects and stores a new image in response to a finger present signal from a finger sensor or a request to take next picture sent from said picture taker, and when said camera stores a new image, said camera sends a first notify signal to said picture taker, and in response to said first notify signal, said picture taker generates and sends a second notify signal to the socket server; whereby, the browser can automatically request an image from the web server in the live scanner.

24. A live scanner that can be accessed over a network, comprising:
a camera that detects print images of live fingerprints of an individual;
an image interface coupled to a browser over the network, wherein said image interface fulfills at least one control option selected by a user at the browser; and
a web server that serves a menu of device configuration options to the browser, wherein in response to a user selecting a device configuration option, said web server sends data that can be used to control said live scanner,
wherein said menu of device configuration options includes user interface settings, wherein said user interface settings include a setting for toggling on or off a sound alert on an acceptable print scan, a setting for toggling on or off a sound alert on an unacceptable print scan, or a setting for toggling on or off a sound alert at start-up.

25. A live scanner that can be accessed over a network, comprising:
a camera that detects print images of live fingerprints of an individual;
an image interface coupled to a browser over the network, wherein said image interface fulfills at least one control option selected by a user at the browser; and
a web server that serves a menu of device configuration options to the browser, wherein in response to a user selecting a device configuration option, said web server sends data that can be used to control said live scanner,
wherein said menu of device configuration options comprise live scanner settings, wherein said live scanner settings include a finger sensor setting for toggling use of the finger sensor on or off, a setting for toggling on or off the capture of a rolled print includes, or a setting for toggling on or off the upsampling of images.

26. The live scanner of claim 25, wherein said live scanner setting includes a setting for inputting a measured horizontal resolution value.

27. The live scanner of claim 25, further comprising:
an Ethernet physical interface;
an Ethernet transceiver; whereby, said image interface is communicatively coupled to the network through said Ethernet transceiver and Ethernet physical interface.

28. The live scanner of claim 27, wherein said Ethernet physical interface comprises a 10BASE-T or 100BASE-T interface.

29. The live scanner of claim 28, further comprising:
a finger sensor that sense the presence or absence of a finger on a platen of the live scanner.

30. The live scanner of claim 25, wherein said image interface includes a socket server and a picture taker.

31. The live scanner of claim 30, wherein said socket server establishes a socket connection with a browser.

32. The live scanner of claim 31, wherein said camera detects and stores a new image in response to a finger present signal from a finger sensor or a request to take next picture sent from said picture taker, and when said camera stores a new image, said camera sends a first notify signal to said picture taker, and in response to said first notify signal, said picture taker generates and sends a second notify signal to the socket server; whereby, the browser can automatically request an image from the web server in the live scanner.

33. A live scanner that can be accessed over a network, comprising:
a camera that detects images of prints; and
an image interface coupled to a browser over the network, wherein said image interface fulfills at least one control option selected by a user at the browser,
wherein said image interface includes a web server that serves a menu of control options to the browser,
wherein the control options include a device settings configuration option, and wherein, in response to a user selecting the device settings configuration option at the browser, said web server sends data relating to at least one of user interface settings, camera settings, print image processing settings, and live scanner settings, and
wherein the user interface settings include settings for toggling on or off a sound alert on an acceptable print scan, a sound alert on an unacceptable print scan, and a play at start-up.

34. A live scanner that can be accessed over a network, comprising:

a camera that detects images of prints; and an image interface coupled to a browser over the network,
wherein said image interface fulfills at least one control option selected by a user at the browser,
wherein said image interface includes a web server that serves a menu of control options to the browser,
wherein the control options include a device settings configuration option, and wherein, in response to a user selecting the device settings configuration option at the browser, said web server sends data relating to at least one of user interface settings, camera settings, print image processing settings, and live scanner settings, and
wherein the live scanner settings include an illumination level setting for setting an illumination level, and a finger sensor setting for toggling use of the finger sensor on or off.

35. A live scanner that can be accessed over a network, comprising:

a camera that detects images of prints; and an image interface coupled to a browser over the network,
wherein said image interface fulfills at least one control option selected by a user at the browser,
wherein said image interface includes a web server that serves a menu of control options to the browser,
wherein the control options include a device settings configuration option, and wherein, in response to a user selecting the device settings configuration option at the browser, said web server sends data relating to at least one of user interface settings, camera settings, print image processing settings, and live scanner settings, and
wherein the live scanner settings include a setting for toggling on or off the capture of a rolled print.

* * * * *